US012570049B2

(12) United States Patent　　　(10) Patent No.:　US 12,570,049 B2
Discekici et al.　　　　　　　　(45) Date of Patent:　　Mar. 10, 2026

(54) REDUCING SURFACE ROUGHNESS OF CURED THREE-DIMENSIONAL PRINTED OBJECTS USING A LOCALIZED HEAT SOURCE

(71) Applicant: PERIDOT PRINT LLC, Palo Alto, CA (US)

(72) Inventors: Emre Hiro Discekici, San Diego, CA (US); Shannon Reuben Woodruff, San Diego, CA (US); Alay Yemane, San Diego, CA (US); Greg Scott Long, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 134 days.

(21) Appl. No.: 18/713,978

(22) PCT Filed: Dec. 3, 2021

(86) PCT No.: PCT/US2021/061777
§ 371 (c)(1),
(2) Date: May 28, 2024

(87) PCT Pub. No.: WO2023/101682
PCT Pub. Date: Jun. 8, 2023

(65) Prior Publication Data
US 2025/0018649 A1　　Jan. 16, 2025

(51) Int. Cl.
*B33Y 40/20*　　　　(2020.01)
*B29C 64/188*　　　(2017.01)
(Continued)

(52) U.S. Cl.
CPC ............ *B29C 64/30* (2017.08); *B29C 64/188* (2017.08); *B29C 64/295* (2017.08);
(Continued)

(58) Field of Classification Search
CPC ... B29C 71/0009; B29C 71/02; B29C 64/188; B33Y 40/20
See application file for complete search history.

(56) References Cited

U.S. PATENT DOCUMENTS 7,125,512 B2 * 10/2006 Crump ................ B29C 33/3842
　　　　　　　　　　　　　　　　　　　264/401
11,396,129 B2 * 7/2022 Erickson ................. B22F 10/62
　　　　　　　　　(Continued)

FOREIGN PATENT DOCUMENTS

CN　　　　102886894 A　　1/2013
CN　　　　104788696 A　　7/2015
　　　　　　(Continued)

OTHER PUBLICATIONS

Tan et al., "Recent progress on polymer materials for additive manufacturing", Advanced Functional Materials, vol. 30, Issue 43, Aug. 6, 2020, 136 pages. https://doi.org/10.1002/adfm.202003062.
(Continued)

*Primary Examiner* — Atul P. Khare
(74) *Attorney, Agent, or Firm* — Dierker & Kavanaugh, P.C.

(57)　　　　　　ABSTRACT
Examples of the present disclosure are directed toward methods and system for reducing surface roughness of a cured three-dimensional (3D) printed object using a localized heat source. An example method includes applying a liquid solvent to the cured 3D printed object and heating the cured 3D printed object with the liquid solvent applied thereto to a temperature below a melting point of the cured 3D printed object using a localized heat source to reduce a surface roughness of the cured 3D printed object as compared to the cured 3D printed object prior to the application of heat.

15 Claims, 4 Drawing Sheets

(51) Int. Cl.

| | |
|---|---|
| *B29C 64/295* | (2017.01) |
| *B29C 64/30* | (2017.01) |
| *B29C 71/00* | (2006.01) |
| *B29C 71/02* | (2006.01) |
| *B29K 77/00* | (2006.01) |

(52) U.S. Cl.
CPC .......... *B29C 71/0009* (2013.01); *B29C 71/02* (2013.01); *B33Y 40/20* (2020.01); *B29K 2077/00* (2013.01); *B29K 2995/0073* (2013.01); *B29K 2995/0077* (2013.01)

(56) References Cited

U.S. PATENT DOCUMENTS

| | | | | |
|---|---|---|---|---|
| 11,453,162 | B2 * | 9/2022 | Dufort | B33Y 40/20 |
| 11,633,913 | B2 * | 4/2023 | Luo | B05B 17/0684 |
| | | | | 264/340 |
| 11,919,262 | B2 * | 3/2024 | Crabtree | B29C 64/153 |
| 12,053,996 | B2 * | 8/2024 | Amouroux | B29C 71/0009 |
| 2005/0173838 | A1 | 8/2005 | Priedeman et al. | |
| 2019/0054666 | A1 | 2/2019 | Shpiro et al. | |
| 2021/0114304 | A1 | 4/2021 | Abstreiter et al. | |
| 2021/0197502 | A1 * | 7/2021 | Kramer | B29C 64/35 |
| 2022/0220269 | A1 | 7/2022 | Delmas et al. | |
| 2023/0029840 | A1 * | 2/2023 | Discekici | B33Y 40/20 |
| 2024/0269922 | A1 * | 8/2024 | Hartman | B29D 11/00923 |

FOREIGN PATENT DOCUMENTS

| | | | |
|---|---|---|---|
| CN | 104098784 B | 12/2017 | |
| DE | 102014102137 B4 | 4/2018 | |
| FR | 3096370 A1 | 11/2020 | |
| RU | 2345888 C2 | 2/2009 | |
| RU | 138467 U1 | 3/2014 | |
| RU | 2625848 C1 | 7/2017 | |
| WO | 2007/044007 A1 | 4/2007 | |
| WO | 2010/002643 A1 | 1/2010 | |
| WO | WO-2015108574 A1 * | 7/2015 | B29C 64/30 |
| WO | 2015/124639 A1 | 8/2015 | |
| WO | 2018/127683 A1 | 7/2018 | |
| WO | 2020/099096 A1 | 5/2020 | |
| WO | 2021/063806 A1 | 4/2021 | |

OTHER PUBLICATIONS

Nsengimana et al., "Improvement of Surface Finish for Additive Manufactured Parts—A Comparison Study of Six Post Processing Techniques", International Journal of Engineering Research & Technology (IJERT), vol. 10, Issue 03, Mar. 2021, pp. 721-735.

* cited by examiner

100

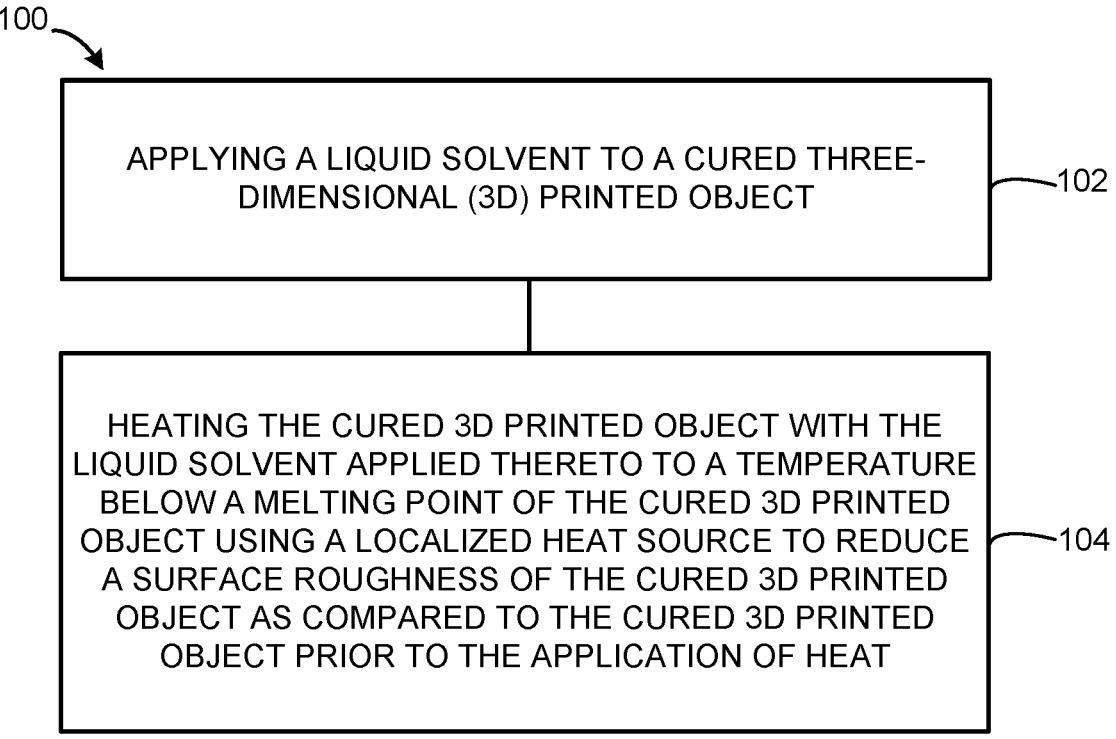

APPLYING A LIQUID SOLVENT TO A CURED THREE-DIMENSIONAL (3D) PRINTED OBJECT ~102

HEATING THE CURED 3D PRINTED OBJECT WITH THE LIQUID SOLVENT APPLIED THERETO TO A TEMPERATURE BELOW A MELTING POINT OF THE CURED 3D PRINTED OBJECT USING A LOCALIZED HEAT SOURCE TO REDUCE A SURFACE ROUGHNESS OF THE CURED 3D PRINTED OBJECT AS COMPARED TO THE CURED 3D PRINTED OBJECT PRIOR TO THE APPLICATION OF HEAT ~104

FIG. 1

REDUCING SURFACE ROUGHNESS OF CURED THREE-DIMENSIONAL PRINTED OBJECTS USING A LOCALIZED HEAT SOURCE

BACKGROUND

Three-dimensional (3D) printing is an additive printing process used to generate 3D objects from a digital model. 3D printing techniques are considered additive as the techniques involve the application of successive layers of material. This is unlike traditional machining processes, which may rely on the removal of material to create the final object. Some 3D printing processes involve curing or fusing material, which for some materials may be accomplished using heat-assisted extrusion or sintering, and for other materials may be accomplished using digital light projection technology.

BRIEF DESCRIPTION OF THE DRAWINGS

FIG. 1 illustrates an example method for reducing surface roughness of a cured 3D printed object using a localized heat source, consistent with the present disclosure.

DETAILED DESCRIPTION

Figure 2:
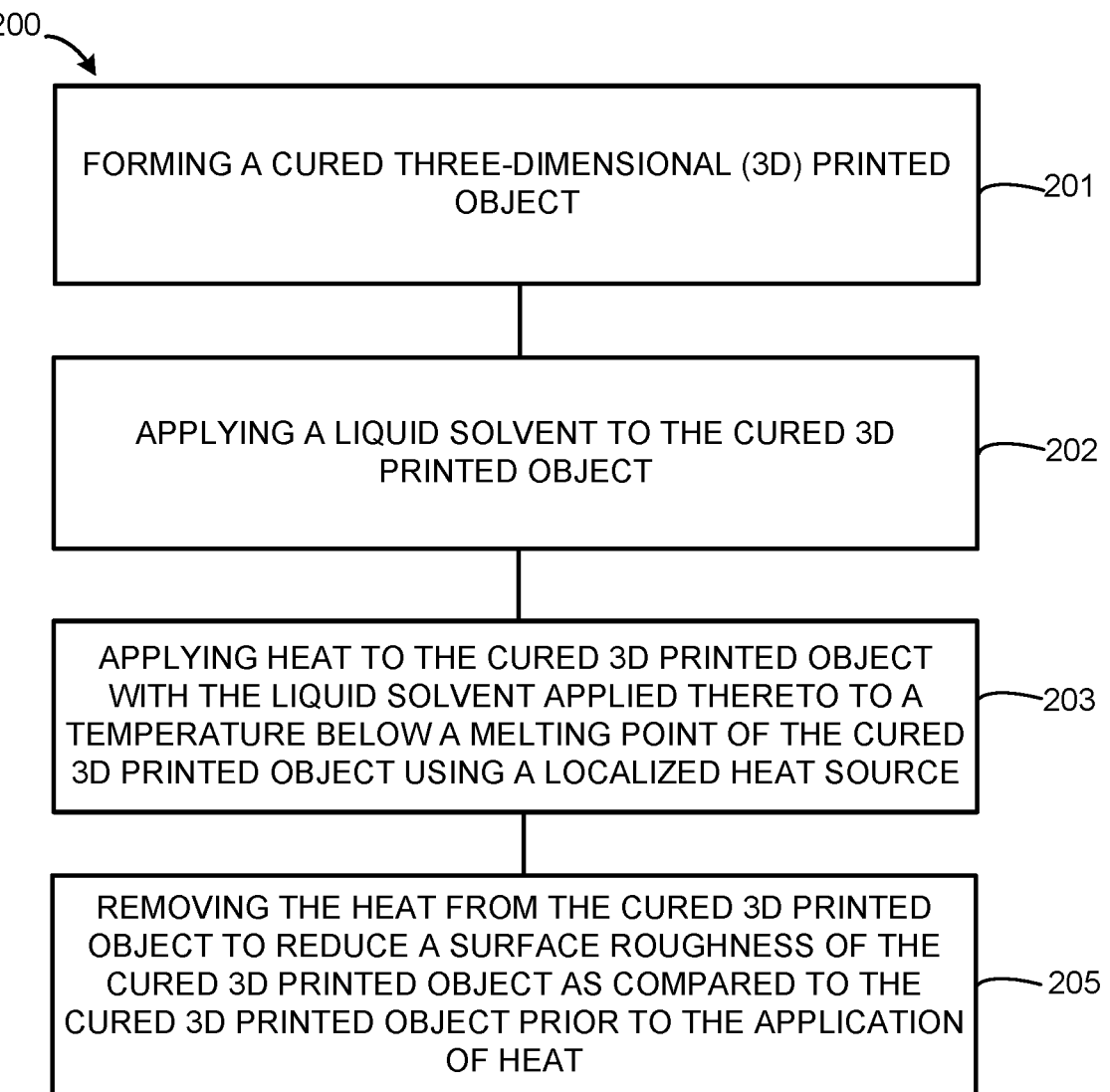
FIG. 2 illustrates another example method for reducing surface roughness of a cured 3D printed object using a localized heat source, consistent with the present disclosure.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

An additive printing process may be used to generate a 3D printed object through the layering and solidification of a build material using a 3D printing system. The build material can be a polymer, metal, ceramic, or a composite material, as further described herein. The printing system may be based on a 3D fabrication process involving the use of electromagnetic radiation for curing a build material using a curing agent to selectively define the 3D printed object or a part of the 3D object layer by layer. For example, the build material may be cured or coalesce to form a single entity, e.g., a layer of a 3D printed object. In some instances, the additive printing process may result in a 3D printed object with a surface roughness greater than a threshold for particular uses, such as greater than 10 micrometers ($\mu$m) or 20 $\mu$m. The threshold may be associated with dying the material or for specific applications, such as footwear and orthotics. The surfaces may be smoothened using various techniques, but such techniques may involve hazardous chemicals, cause mechanical detriments to the 3D printed objects, and/or involve complex hardware and time. Some techniques may result in holes or cracks in the surface of the 3D printed object.

Examples in accordance with the present disclosure are directed to methods and systems for smoothening out surfaces of a cured 3D printed object using a localized heat source to apply heat to the cured 3D printed object. A solvent including an alcohol, such as a non-toxic or non-hazardous alcohol, is applied to the cured 3D printed object, followed by the application of heat by the localized heat source. The heat may be applied while the cured 3D printed object is within an ambient environment, such that the 3D printed object is not isolated by specialized hardware and the ambient environment is not isolated from the solvent and/or heat applied. By not using specialized hardware, the processing time and cost may be reduced, and the post-processing smoothening technique may be scaled to mass production.

The localized heat source may apply localized vectors of heat to the cured 3D printed object with the solvent applied thereto, and which surprisingly provides a solubilizing effect on a surface of the cured 3D printed object and reduces a surface roughness of the cured 3D printed object. In some examples, the localized vectors of heat applied to the surface of the cured 3D printed object with the solvent applied may allow for layers of the cured 3D printed object to further blend or fuse to one another, thereby improving mechanical properties of the cured 3D printed object. For example, the process may minimally impact the Young's Modulus and/or improve tensile strength and elongation at break for the cured 3D printed object, as further described herein.

As used herein, an ambient environment includes and/or refers to an environment that a system including the localized heat source, solvent source, and cured 3D printed object are located in and/or conditions that surrounds the system, such as a room of a building. An ambient environment may be at ambient temperature and/or ambient pressure. Ambient temperature includes and/or refers to a temperature of the ambient environment, which may be set by a user (e.g., a thermostat). The ambient temperature may be referred to as a room temperature. Ambient pressure includes and/or refers to atmospheric pressure at an altitude of the ambient environment.

A cured 3D printed object includes and/or refers to an object formed by an additive printing process and which has been cured. A 3D printed object includes and/or refers to an object formed by an additive printing process prior to curing.

Non-hazardous includes and/or refers to a material, compound, or other substance which is not hazardous. Hazardous includes and/or refers a material, compound, or other substances which are ignitable, corrosive, reactive, and/or toxic. Non-toxic includes and/or refers to material, compound, or other substance which is not poisonous or is not capable of causing harm to an organism, such as a human, animal, or plant.

Referring now to the figures, FIG. 1 illustrates an example method for reducing surface roughness of a cured 3D printed object using a localized heat source, consistent with the present disclosure. The method 100 may be implemented using a system, such as the system 320 further illustrated herein.

At 102, the method 100 includes applying a liquid solvent to a cured 3D printed object, the liquid solvent including an alcohol. A solvent includes and/or refers to a compound or composition that is used for treating a cured 3D printed object. The liquid solvent is in a liquid form. An alcohol, as used herein, is any organic compound that carries at least one OH group, which may optionally have further substituents or functional groups, such as amino, carboxyl, and ester. Alcohols include substituted or unsubstituted aliphatic $C_1$-$C_{10}$ alcohols or substituted or unsubstituted aromatic $C_6$ to $C_{12}$ alcohols or mixtures thereof. Example substituents include halogen, $C_1$-$C_{10}$ alkyl, and a $C_6$ to $C_{12}$ aromatic group, such as phenyl. Non-limiting examples alcohols include benzyl alcohol, glycerol, and propylene glycol. In some examples, the solvent may include a mixture that includes the alcohol and a second liquid. The second liquid may have a higher melting point than the alcohol, such as water. In some examples, the liquid solvent may include a mixture of the alcohol to the second liquid of between about 1:1 and about 1:20, about 1:1 and about 1:10, about 1:1 and about 1:2, about 1:5 and about 1:20, about 1:10 and about 1:20, or about 1:5 and 1:10, such as 1:1, 1:2; 1:5, 1:10, or 1:20, among other ratios.

Applying the liquid solvent may include submerging the cured 3D printed object in the liquid solvent or applying the liquid solvent as a layer on the cured 3D printed object, such as by spraying or dripping the liquid solvent. In some examples, the cured 3D printed object is submerged in the liquid solvent for a period of time and then removed from the liquid solvent, or the liquid solvent is otherwise applied for the period of time prior to applying heat, as described below. The period of time may include between about 0.5 seconds and about 30 minutes. In some examples, the period of time includes between about 0.5 seconds and about 25 minutes, about 0.5 seconds and about 20 minutes, about 0.5 seconds and about 15 minutes, about 0.5 seconds and about 10 minutes, about 0.5 seconds and about 5 minutes, or about 0.5 seconds and about 1 minute. In some examples, the period of time is less than about 1 minute, such as between about 0.5 seconds and about 45 seconds, about 0.5 seconds and about 30 seconds, about 0.5 seconds and about 15 seconds, or about 0.5 seconds and about 5 seconds, among other ranges.

Examples are not limited to submerging, spraying, or dripping the liquid solvent, and applying the liquid solvent may include a variety of application techniques in which at least a portion of the cured 3D printed object is fully or partially contacted by the liquid solvent. In some examples, the liquid solvent contacts a whole surface of the cured 3D printed object and may flow into channels, holes etc., and/or may contact select parts of the cured 3D printed object.

As described above, the printed 3D object is cured prior to applying the liquid solvent at 102. For example, the method 100 may include forming the cured 3D printed object by forming a 3D printed object using an additive printing process and a build material, and curing the 3D printed object to form the cured 3D printed object prior to applying the liquid solvent. The build material may be a powder, a liquid, a paste, or a gel, such as a powder polymer. In some examples, the build material is a polyamide material. Example polyamide materials include a type of polyamide, a mixture of two or more types of polyamide, polyamide copolymers such as PA6/PPO, nylon, as well as polyamide blends, aliphatic, semi-aromatic and aromatic polyamides, for example polyamide 6 (PA6), polyamide 6.6 (PA6.6), polyamide 11 (PA11), polyamide 12 (PA12), PA 4.6 (PA4.6), polyamide 612 (PA612), polyphthalamide (PPA), thermoplastic polyamides or co-polyamides, and blended or filled polyamides.

However examples are not so limited and may include a variety of build material, such as different types of polymer material. Example polymers include a type of monomer, and/or two or more types of monomers, such as homopolymers, copolymers, block polymers and mixtures of different types of polymers. Example build materials include polyamides, modified polyamides, polyethylene, polyethylene terephthalate (PET), and amorphous variations of the materials. Other example build materials include polystyrene, polyacetals, polypropylene, polycarbonate, polyester, polyurethanes, other engineering plastics, and blends of two or more of the polymers listed herein. Core shell polymer particles of these materials may also be used.

When the build material is in powder form, the build material may be made up of similarly sized particles or differently sized particles. Size, as used herein, refers to the diameter of a spherical particle, or the average diameter of a non-spherical particle. In some examples, the average size of the particles of the build material ranges from about 10 μm to about 100 μm or about 40 μm to about 50 μm. In some examples, the diameter or average diameter of the particles may be measured using a volume based size distribution analytical chemical analysis. The size of the particles may be measured by using a static light scattering technique, such as laser diffraction.

The build material may further include other components such as a charging agent and/or a flow aid. Charging agent(s) may be added to suppress tribo-charging. Example charging agents include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some commercially available charging agents include HOSTASTAT® FA 38 (natural based ethoxylated alkylamine), HOSTASTAT® FE2 (fatty acid ester), and HOSTASTAT® HS 1 (alkane sulfonate), available from Clariant Int. Ltd.). In some examples, the charging agent is added in an amount ranging from greater than 0 weight percent (wt %) to less than 5 wt % of the total weight of the build material.

At 104, the method 100 includes heating the cured 3D printed object with the liquid solvent applied thereto to a temperature below a melting point of the cured 3D printed object using a localized heat source to reduce a surface roughness of the cured printed object as compared to the cured 3D printed object prior to the application of heat. A localized heat source, as used herein, includes and/or refers to a device which outputs heat in localized vectors while in an ambient environment, such as heat beams directed toward the cured 3D printed object. Example localized heat sources include a heat gun, a blow torch, and other types of devices with an active flame which may output the heat in localized vectors.

Using the localized heat source, the cured 3D printed object with the liquid solvent applied thereto is heated to reduce a surface roughness of a surface of the cured 3D printed object. The surface roughness of the cured 3D printed object may be reduced by at least three times compared to the cured 3D printed object prior to the application of the heat. For example, the surface roughness of the cured 3D printed object may be reduced by between about three times and about four times, about three times and about ten times, about three times and about twenty times, about four times and about ten times, about ten times and about twenty times, at least about four times, at least about ten times, or at least about twenty times, among other variations.

As used herein, a surface roughness of the cured 3D printed object includes and/or refers to a texture on a surface of the cured 3D printed object. Surface roughness may be quantified by deviations in a profile of the surface, such as deviations in a direction that is normal to the surface. Measured values for the profile may be obtained by scanning the profile with a probe. Surface imperfections, such as cracks, scratches and dents, may not be part of the profile and may not be included in the measured value. A roughness parameter may be used, such as $R_a$, an arithmetical mean roughness value, where the mean of the absolute values of the profile deviations from the mean line of the roughness profile is measured, or $R_z$, a mean roughness depth, where the mean value of i (such as i=5) profile deviations from i sampling length is measured. The surface roughness may be measured using a surface roughness gauge, such as a Mitutoyo surface roughness gauge.

In some examples, the build material may have a melting point ranging from about 55 degrees Celsius (° C.) to about 450° C. In some examples, the build material may have a melting point of between about 100° C. and about 300° C., or about 155° C. and about 160° C. However, examples are not so limited and the build material may have a melting point of a variety of ranges and values.

In some examples, the heat applied to the cured 3D printed object by the localized heat source is between about 100° C. and about 300° C. in an ambient environment. In some examples, the heat applied is between about 155° C. and about 160° C. in the ambient environment. For example, the ambient temperature of the environment may be a lower temperature than the heat applied to the cured 3D printed object. However, examples are not so limited, and a variety of different temperatures of heat may be applied to the cured 3D printed object by the localized heat source, such as between about 100° C. and about 500° C., about 100° C. and about 475° C., about 100° C. and about 450° C., about 100° C. and about 425° C., about 100° C. and about 400° C., about 100° C. and about 375° C., about 100° C. and about 350° C., about 100° C. and about 325° C., about 100° C. and about 275° C., about 100° C. and about 250° C., about 100° C. and about 225° C., about 100° C. and about 200° C., about 100° C. and about 175° C., about 150° C. and about 500° C., about 200° C. and about 500° C., about 150° C. and about 450° C., about 150° C. and about 400° C., about 150° C. and about 350° C., or about 150° C. and about 300° C., among other temperature ranges. In some examples, as described below, the heat applied to the cured 3D printed object may be greater than the melting point of the cured 3D printed object for a portion of the period of time, e.g., the total time, of applying the heat.

In some examples, the method 100 includes heating the cured 3D printed object to a temperature below the melting point of the object for a period of time. The period of time may include between about one second and about five minutes. For example, the method 100 may include removing the heat from the cured 3D printed object after the about one second to about five minutes and, optionally, allowing the cured 3D printed object to transition to an ambient temperature (e.g., room temperature). In some examples, the period of time may include less than thirty seconds, such as between about one second and about thirty seconds, about one second and about twenty-five seconds, about one second and about twenty seconds, about one second and about fifteen second, about one second and about ten seconds, about one second and about five seconds, or about one second and about two seconds, among other time ranges.

In some examples, the method 100 includes heating the cured 3D printed object to the temperature below the melting point of the cured 3D printed object using the localized heat source for the period of time, and heating to another temperature above the melting point of the cured 3D printed object for a portion of the period of time. The portion of the period of time may include between about 0.1 seconds and about three seconds, such as between about 0.1 seconds and about two seconds, about 0.1 seconds and about 1 second, about 0.1 seconds and about 0.9 seconds, about 0.1 seconds and about 0.8 seconds, about 0.1 seconds and about 0.7 seconds, about 0.1 seconds and about 0.6 seconds, or about 0.1 seconds and about 0.5 seconds, among other ranges. For example, the portion of the period of time may include about three seconds, two seconds, a second, or a fraction of a second, such as about 0.9, 0.8, 0.7, 0.6, 0.5, 0.4, 0.3, 0.2, or 0.1 seconds. The other temperature above the melting point may include a temperature between about 60° C. and about 500° C. or above. In other examples, the other temperature includes a temperature between about 100° C. and about 500° C., about 155° C. and about 500° C., about 160° C. and about 500° C., about 175° C. and about 500° C., about 200° C. and about 500° C., about 250° C. and about 500° C., about 300° C. and about 500° C., about 350° C. and about 500° C., about 400° C. and about 500° C., or about 450° C. and about 500° C., among other temperature ranges.

The heat applied or output by the localized heat source may be a temperature above the ambient temperature of the ambient environment. As the heat is applied using the localized heat source and for the period of time, the heat may have minimal or no impact on the temperature of the ambient environment, such as minimally increasing temperature of the ambient environment, and without the use of specialized hardware, such as pressurized chambers to isolate the cured 3D printed object, the solvent, and the heat applied from the ambient environment. For example, the method 100 includes applying the liquid solvent to the cured 3D printed object and applying the heat to the cured 3D printed object while the cured 3D printed object is exposed to the ambient pressure of the ambient environment. Surprisingly, the method 100 results in decreased surface roughness of at least three times and without negatively impacting mechanical properties of the cured 3D printed object. By not using specialized hardware, the method 100 may be used to process scaled amounts of cured 3D printed objects.

The method 100 may include various variations. For example, the cured 3D printed object may be placed on a thermally-conductive material, such as a layer of aluminum foil, prior to or after heating the cured 3D printed object using the localized heat source. In some examples, the thermally-conductive material may be used to assist with heating the cured 3D printed object by reflecting thermal energy.

In some examples, the method 100 further includes drying the cured 3D printed object in a vacuum oven. For example, after heating the cured 3D printed object and removing the heat, the cured 3D printed object may be allowed to cool to the ambient temperature and then is placed in the vacuum oven with the vacuum turned on for a period of time. The vacuum oven may apply heat to the cured 3D printed object to a temperature below the temperature that the cured 3D printed object is heated to by the localized heat source and to evaporate remaining liquid solvent. For example, the vacuum oven may apply heat from between about 50° C. and about 100° C., and in some examples to about 70° C., and for a period of time of between about thirty minutes and about twenty-four hours. In some examples, the period of time may be between about thirty minutes and about twenty hours, about thirty minutes and about fifteen hours, about thirty minutes and about ten hours, about thirty minutes and about five hours, about thirty minutes and about one hour, about one hour and about twenty hours, about two hours and about twenty hours, about five hours and about twenty hours, about ten hours and about twenty hours, or about fifteen hours and about twenty hours, among other time periods. In some examples, the cured 3D printed object is removed from the vacuum oven and allowed to cool to the ambient temperature.

FIG. 2 illustrates another example method for reducing surface roughness of a cured 3D printed object using a localized heat source, consistent with the present disclosure. The method 200 of FIG. 2 may include an implementation of the method 100 of FIG. 1, in some examples.

At 201, the method 200 includes forming a cured 3D printed object. As previously described, the 3D printed object may be formed using an additive printing process, such as a multi-jet fusion (MJF) printing process. In various examples, the cured 3D printed object is formed using a polyamide material. However, examples are not so limited and the cured 3D printed object may be formed of a variety of different build materials, as previously described.

An additive printing process may be performed in several stages using a 3D printing system. In a build material depositing stage, a layer of build material (e.g., powder) is deposited onto a build platform of a 3D printing system. In the curing agent depositing stage, the curing agent is distributed onto the layer of build material. For example, the curing agent is deposited at positions where it is intended for the build material to be bound together. Thermal energy is applied to cause particles of the build material to bind or cure together using the curing agent. This stage may be referred to as a fusing stage, a curing process, or an annealing process/stage. For example, curing may be achieved by increasing the amount of thermal energy provided in the fabrication chamber. Following the curing process, the build material becomes bound or solidified, e.g., cured.

At 202, the method 200 includes applying a liquid solvent to the cured 3D printed object, where the liquid solvent includes an alcohol. At 203, the method 200 includes applying heat to the cured 3D printed object with the liquid solvent applied thereto to a temperature below a melting point of the cured 3D printed object using a localized heat source. And, at 205, after between about one second to about five minutes, the method 200 includes removing the heat from the cured 3D printed object to reduce a surface roughness of the cured 3D printed object as compared to the cured 3D printed object prior to the application of heat.

As previously described, the heat may be removed after different amounts of time in different examples, such as between about one second to about thirty seconds, or less than thirty seconds. Further, in some examples, applying heat may include applying to another temperature that is above the melting point of the cured 3D printed object for a portion of the about one second to about five minutes.

In various examples, the surface roughness of the cured 3D printed object is reduced by at least three times compared to the cured 3D printed object prior to the application of heat. In some examples, the surface roughness of the cured 3D printed object is reduced by at least four times, at least ten times, or at least twenty times compared to the cured 3D printed object prior to the application of heat, among other values.

In some examples, the application of heat may cause improvement in and/or a positive impact on mechanical properties of the cured 3D printed object. Example mechanical properties include a Young's Modulus, a thickness, a strength, and a ductility, as well as combinations thereof. The mechanical properties, as described below, may be measured using an Instron tensiometer.

In some examples, the application of heat may cause minimal change in the Young's Modulus of the cured 3D printed object. Young's Modulus, as used herein, includes and/or refers to a measure of tensile or compressive stiffness of a material when a force is applied lengthwise. For example, the cured 3D printed object may exhibit a minimal change in Young's Modulus as compared to the cured 3D printed object prior to the application of the heat. In some examples, the cured 3D printed object may exhibit a change (e.g., decrease) in Young's Modules of between about three megapascals (MPa) and about 0.1 MPa, about two MPa and about 0.1 MPa, about one MPa and about 0.1 MPa, about 0.75 MPa and about 0.1 MPa, about 0.5 MPa and about 0.1 MPa, or about 0.2 MPa and about 0.1 MPa, among other ranges. In some examples, the Young's Modules may change between about 0.1 percent (%) and about 10% of the Young's Modules of the cured 3D printed object prior to the application of the heat, such as between about 0.1% and about 9%, about 0.1% and about 5%, about 0.1% and about 1%, about 0.5% and about 10%, about 0.5% and about 9%, or about 0.5 percent and about 5%, among other ranges.

In some examples, the application of heat may cause minimal change in a thickness of the cured 3D printed object. For example, the cured 3D printed object may exhibit minimal change in thickness as compared to the cured 3D printed object prior to the application of the heat. In some examples, the cured 3D printed object may exhibit a change (e.g., decrease) in thickness of between about 0.05 millimeters (mm) and about 0.5 mm, about 0.05 mm and about 0.3 mm, about 0.05 mm and about 0.2 mm, about 0.05 mm and about 0.1 mm, about 0.1 mm and about 0.5 mm, about 0.1 mm and about 0.4 mm, about 0.1 mm and about 0.3 mm, about 0.1 mm and about 0.2 mm, about 0.2 mm and about 0.4 mm, or about 0.3 mm and about 0.4 mm, among other ranges. In some examples, the thickness may change between about 0.1% and about 10% of the thickness of the cured 3D printed object prior to the application of the heat, such as between about 0.1% and about 5%, about 0.1% and about 1%, about 1% and about 10%, about 2% and about 10%, or about 2% and about 5%, among other ranges.

In some examples, the application of heat may cause improvement in the tensile stress at maximum load and/or percent elongation at break of the cured 3D printed object. Tensile stress at maximum load includes and/or refers to a maximum load that a material may withstand. Percent elongation at break includes and/or refers to a percent increase in length that a material achieves before breaking. For example, applying the heat to the cured 3D printed object with the liquid solvent applied thereto and removing the heat may cause an increase in tensile stress at maximum load and an increase in percent elongation at break as compared to the cured 3D printed object prior to the application of heat.

In some examples, the cured 3D printed object may exhibit an increase in tensile stress at maximum load of between about 0.5 MPa and about 1.0 MPa, about 0.6 MPa and about 1.0 MPa, about 0.7 MPa and about 1.0 MPa, about 0.8 MPa and about 1.0 MPa, about 0.9 MPa and about 1.0 MPa, about 0.5 MPa and about 0.9 MPa, about 0.5 MPa and about 0.8 MPa, about 0.5 MPa and about 0.7 MPa, about 0.5 MPa and about 0.6 MPa, or about 0.6 MPa and about 0.9 MPa, among other ranges. In some examples, the tensile stress at maximum load may increase by between about 10% and about 25% of the tensile stress at maximum load of the cured 3D printed object prior to the application of the heat, such as between about 10% and about 20%, about 10% and about 15%, about 12% and about 25%, about 15% and about 20%, or about 12% and about 20%, among other ranges.

In some examples, the cured 3D printed object may exhibit an increase in percent elongation at break of between about 10 and about 75, about 10 and about 60, about 10 and about 50, about 10 and about 40, about 10 and about 25, about 15 and about 75, about 20 and about 75, about 30 and about 75, about 40 and about 75, or about 50 and about 75, among other ranges. In some examples, the percent elongation at break may increase by between about 10% and about 130% of the tensile stress at maximum load of the cured 3D printed object prior to the application of the heat, such as between about 10% and about 120%, about 10% and about 100%, about 10% and about 75%, about 10% and about 50%, about 10% and about 25%, about 25% and about 130%, about 50% and about 130%, or about 75% and about 130%, among other ranges.

Figure 3:
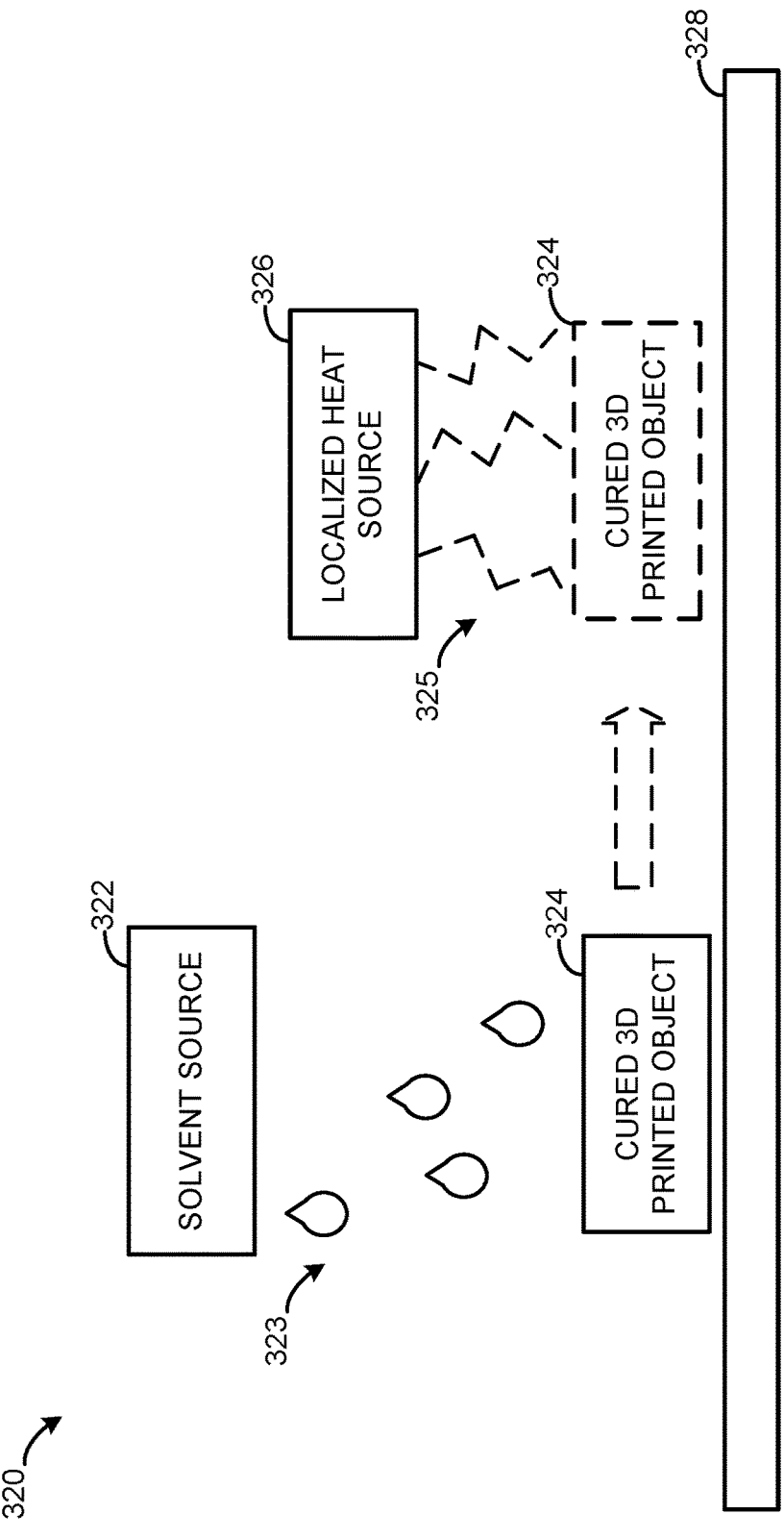
FIG. 3 illustrates an example system including a localized heat source for reducing surface roughness of a cured 3D printed object, consistent with the present disclosure.

FIG. 3 illustrates an example system including a localized heat source for reducing surface roughness of a cured 3D printed object, consistent with the present disclosure. The system 320 may be referred to as a post-processing system as the system is used to process a cured 3D printed object 324.

The system 320 includes the cured 3D printed object 324 formed by an additive printing process, a solvent source 322, and a localized heat source 326, as previously described. In some examples, at least a portion of the system components may be operatively connected to processor circuitry, such as a central processing unit (CPU) (not shown) of the system 320. The processor circuitry (e.g., running computer readable instructions stored on a non-transitory, tangible computer readable storage medium) manipulates and transforms data to control the components of the system 320 to reduce a surface roughness of the cured 3D printed object 324.

The data may include information identifying the type of build material used to form the cured 3D printed object 324, the solvent stored by the solvent source 322, and other information of the cured 3D printed object 324, such as a target surface roughness. For example, the amount of heat, e.g., the period of time the heat is applied and the temperature, may depend on various factors such as material, shape, and size of the cured 3D printed object 324 to be treated, the type of liquid solvent, and surface roughness of the cured 3D printed object 324 to be treated.

The solvent source 322 is to apply a solvent in a liquid form to the cured 3D printed object 324, with the solvent including an alcohol. The solvent source 322 may include a reservoir to store the liquid solvent 323. As previously described, the alcohol may include benzyl alcohol, glycerol, or propylene glycol. In some examples, the alcohol may include a methylphenol derivative, such as cresols. In some examples, the liquid solvent 323 includes a mixture of the alcohol and a second liquid. The mixture may be provided by a variety of sources, such as a mixer. Example mixers include an industrial paddle mixer, a high shear mixer, a resonant acoustic mixer, and a jet mills, among others.

In some examples, the solvent stored by the solvent source 322 may be applied to the cured 3D printed object 324 by submerging the cured 3D printed object 324 in the reservoir storing the liquid solvent 323. The cured 3D printed object 324 may be submerged manually by a user and/or via robotics (e.g., movable robotic arm, not shown) of the system 320 which picks-up the cured 3D printed object 324 from a support member 328 (e.g., conveyor belt or other type of support member coupled to a movable stage) and submerges the cured 3D printed object 324 in the reservoir. In some examples, the solvent source 322 may include the reservoir and spray equipment which may spray or otherwise layer the liquid solvent 323 onto the cured 3D printed object 324.

While not shown, the cured 3D printed object 324 may be mounted on a moveable stage to move bi-directionally across the length of the support member 328 along the illustrated Y-axis. In other examples, the support member 328 includes a conveyor belt which moves the cured 3D printed object 324 along the Y-axis. In other examples, the cured 3D printed object 324 may be fixed and the support member 328 moves relative thereto.

In some examples, the solvent source 322 may include or coupled to a solvent distributor. The solvent distributor is used to provide the layer of the solvent on the cured 3D printed object 324. Example solvent distributors 695 include a sprayer and/or a fluid ejection device (e.g., inkjet printing device), among other types of devices that may distribute the liquid solvent 323.

As shown by FIG. 3, the cured 3D printed object 324 with the liquid solvent 324 applied thereto is brought in proximity to the localized heat source 326. In some examples, the cured 3D printed object 324 may be moved, and in other examples and/or in addition, the localized heat source 326 may be moved. In some examples, the cured 3D printed object 324 may be moved using the support member 328, such as a conveyor belt or movable stage coupled to the support member 328. In other examples, the cured 3D printed object 324 may be manually moved. In some examples, the cured 3D printed object 324 may be a threshold distance away from the output of heat from localized heat source 326. For example, the cured 3D printed object 324 may be about 1 inch (") away from the localized heat source 324 when the heat is applied. In other examples, the cured 3D printed object 324 may between about 0.5" and about 6", about 0.5" and about 5", about 0.5" and about 4", about 0.5" and about 3", about 0.5" and about 2", about 0.5" and about 1", about 1" and about 5", about 1" and about 4", about 1" and about 3", about 1" and about 2", about 2" and about 4", or about 3" and about 5" from the localized heat source 324, among other ranges.

The localized heat source 326 may cause heating of the cured 3D printed object 324 to below a melting point of a build material forming the cured 3D printed object 324 for between about one second to about five minutes to reduce a surface roughness of the cured 3D printed object as compared to the cured 3D printed object prior to the application of heat. As previously described, the localized heat source 326 includes a heat gun, a blow torch, or other types of devices with an active flame which provides the heat 325 to the cured 3D printed object 324 without isolating the cured 3D printed object 324 from an ambient environment, such as without the use of specialized hardware (e.g., process chambers).

The length of time the solvent is applied to the 3D printed object (prior to the application of heat) and/or the length of time the heat 325 is applied to the cured 3D printed object with the solvent applied thereto may be dependent on characteristics of the build material forming the cured 3D printed object, and characteristics of the cured 3D printed object itself, such as shapes and uses, and/or characteristics of the solvent, as previously described.

In some examples, the system 320 may further include a vacuum oven (not shown). The vacuum oven may dry the cured 3D printed object 324 after the application of heat. For example, the heat from the localized heat source 326 may be removed after the about one second to about five minutes, and the cured 3D printed object 324 is allowed to cool to ambient temperature of the ambient environment. The cured 3D printed object 324 is then placed in the vacuum oven and dried for a period of time, as described above.

In various examples, the application and removal of heat may reduce a surface roughness of the cured 3D printed object 324 while minimizing a change in Young's Modulus and improving other mechanical properties, as previously described. In some examples, the cured 3D printed object 324 has a first Young's Modulus prior to the application of heat and has about the first Young's Modulus after the application of heat.

The various ranges provided herein include the stated range and any value or sub-range within the stated range. Furthermore, when "about" is utilized to describe a value, this includes, refers to, and/or encompasses variations (up to +/−10%) from the stated value.

Reference throughout the specification to "examples", "an example", "some examples", and so forth, means that a particular element (e.g., feature, structure, and/or characteristic) described in connection with the example is included in the example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

EXAMPLES

The following illustrates examples of processing cured 3D printed objects using a localized heat source and a solvent, and related aspects described in the present disclosure. These examples should not be considered to restrict the present disclosure, but are merely in place to teach how to implement aspects of the present disclosure.

Various experiments were directed to processing a cured 3D printed object using a solvent of alcohol and a localized heat source, while the cured 3D printed object is in an ambient environment. In various experiments, thermoplastic polyamide (TPA) material was used as the build material to form 3D printed objects using MJF. The resulting 3D printed objects were cured and separated into control groups and treatment groups. The control groups had no liquid solvent applied thereto. The treatment groups had liquid solvent applied thereto and were heated using a heat gun to reduce surface roughness.

For the treatment groups, the liquid solvent included benzyl alcohol which was applied to a surface of the cured 3D printed objects. For example, each cured 3D printed object was placed into a container and the container was filled with the benzyl alcohol until the cured 3D printed object was fully submerged. The cured 3D printed objects were then removed from the container and placed on aluminum foil. A commercially available heat gun was placed about an inch away from each cured 3D printed object and used to heat the cured 3D printed objects for thirty seconds. The cured 3D printed objects were allowed to cool down to room temperature and then placed into a 70° C. degree vacuum oven with the vacuum turned on. After twenty-four hours, the cured 3D printed objects were removed from the vacuum oven and allowed to cool to room temperature.

Figure 4A:
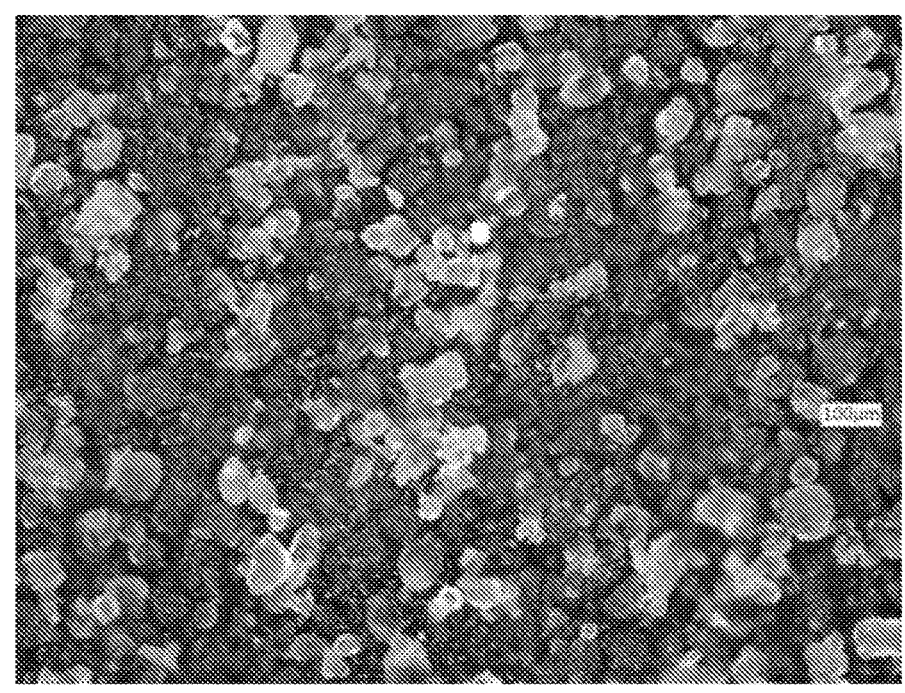
FIGS. 4A-4B illustrate images of experimentally processed cured 3D printed objects, consistent with the present disclosure.
Figure 4B:
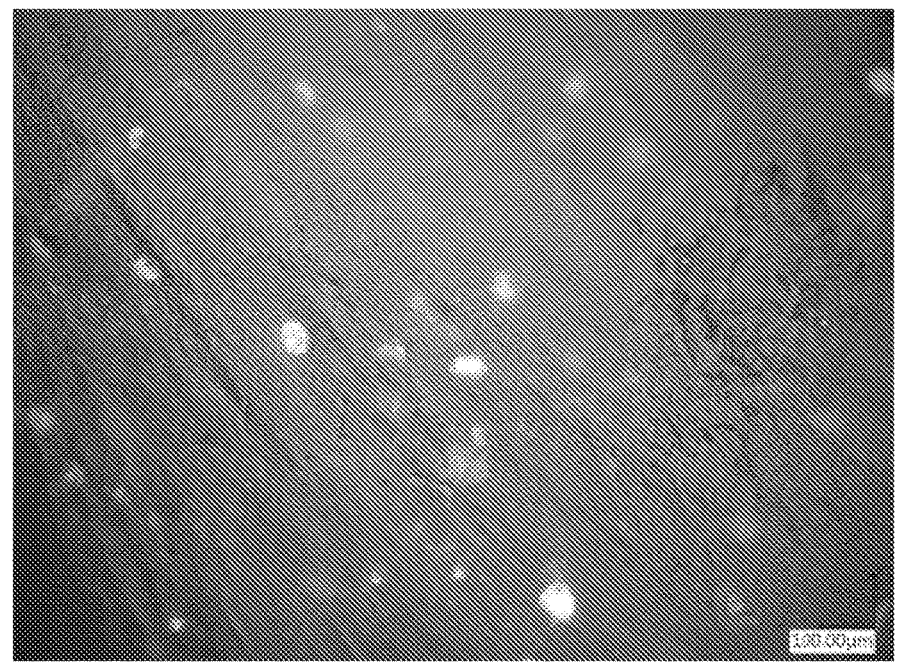

The resulting cured 3D printed objects with the application of heat exhibit reduced surface roughness as further illustrated by the microscope images of FIGS. 4A-4B which show the improvement in smoothness obtained by the treatment group. It is believed that the liquid solvent, when exposed to burst of heat for the period of time, offer a rapid solubilizing effect on the surface of the cured 3D printed objects.

FIGS. 4A-4B illustrate images of experimentally processed cured 3D printed objects, consistent with the present disclosure. A Mitutoyo surface roughness gauge was used to measure the surface roughness. FIG. 4A is an optical micrograph image of a surface of TPA of a cured 3D printed object in the control group, which is not treated with the liquid solvent. FIG. 4B is an optical micrograph image of surface of TPA of a cured 3D printed object in the treatment group, which shows smoother surface part surface as compared to FIG. 4A.

Table 1 illustrates example average surface roughness values in microns of three cured 3D printed objects in the control group, as received from a sand-blaster cleaning process.

TABLE 1

| Control Group Average Surface Roughness | |
| --- | --- |
| Control TPA Top | Control TPA Bottom |
| 12.584 | 11.119 |
| 13.66 | 11.045 |
| 13.012 | 10.747 |

Table 2 illustrates example average surface roughness values in microns of three cured 3D printed objects in the treatment group, after being treated with benzyl alcohol and heated for thirty seconds using a localized heat source. As shown by Table 2, the results showed reproducibility and a greater than ten times reduction in surface roughness.

TABLE 2

| Treatment Group Average Surface Roughness | |
| --- | --- |
| Control TPA Top | Control TPA Bottom |
| 0.646 | 2.767 |
| 0.696 | 2.992 |
| 0.626 | 2.144 |
| Average = 0.656 | Average = 2.634 |

The control group and treatment group were further tested for changes in mechanical properties using an Instron tensiometer to illustrate changes in Young's Modulus, thickness, tensile strength, and elongation at break. Table 3 illustrates example mechanical properties of the cured 3D printed objects in the control group and the treatment group. The cured 3D printed objects in the control group were placed in the vacuum oven for twenty-four hours prior to testing, but without treatment of benzyl alcohol and heat for thirty seconds. The cured 3D printed objects in the treatment group were treated with benzyl alcohol and heat for thirty seconds, and then placed in the vacuum oven for twenty-four hours prior to testing.

TABLE 3

| Mechanical Properties | | | | |
| --- | --- | --- | --- | --- |
| Control or Treatment | Tensile Stress at Max Load (MPa) | Young's Modulus (MPa) | % Strain at Break | Thickness (mm) |
| Control #1 | 4.77038 | 26.66629 | 57.96 | 2.10 |
| Control #2 | 4.56739 | 25.43265 | 54.94 | 2.12 |

TABLE 3-continued

| | Mechanical Properties | | | |
| Control or Treatment | Tensile Stress at Max Load (MPa) | Young's Modulus (MPa) | % Strain at Break | Thickness (mm) |
| --- | --- | --- | --- | --- |
| Control #3 | 5.03108 | 27.88199 | 70.81 | 2.12 |
| Treatment #1 | 5.8962 | 25.55459 | 114.81 | 1.97 |
| Treatment #2 | 5.61639 | 25.59514 | 84.68 | 1.95 |
| Treatment #3 | 5.80154 | 26.57895 | 97.83 | 2.00 |

Table 4 provides example surface roughness values in microns of a cured 3D printed object, where one part of the cured 3D printed object was treated as the treatment group and another part of the cured 3D printed object was treated as the control group.

TABLE 4

| Selective Treatment | |
| Description | Top Average Surface Roughness |
| --- | --- |
| TPA Control Part | 11.992 |
| TPA Treatment Part | 2.7743 |

The experiments were conducted to show reproducibility of a simple surface finish process of cured 3D printed objects obtained from an MJF print process. The process may be useful for polyamides, such as in footwear, orthotics, and molded fiber verticals to reduce a surface roughness using the simple process which is decoupled from the MJF print process. The finish process may provide a high degree of surface roughness reduction within seconds and uses commercially available and non-hazardous alcohols. The surface roughness may be reduced by three to four or more times on various geometries, such as tensile bars and foot orthotics, and with little to no distortion or mechanical compromise of the cured 3D printed objects.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method comprising:
applying a liquid solvent to a cured three-dimensional (3D) printed object, the liquid solvent including an alcohol; and
heating the cured 3D printed object with the liquid solvent applied thereto to a temperature below a melting point of the cured 3D printed object using a localized heat source applying localized vectors of heat to reduce a surface roughness of the cured 3D printed object as compared to the cured 3D printed object prior to the application of heat.

2. The method of claim 1, further including forming the cured 3D printed object by forming a 3D printed object by an additive printing process with a polyamide material, and curing the 3D printed object to form the cured 3D printed object prior to applying the liquid solvent.

3. The method of claim 1, wherein applying the liquid solvent to the cured 3D printed object comprises at least one of:
submerging the cured 3D printed object in the liquid solvent; and
applying the liquid solvent as a layer on the cured 3D printed object.

4. The method of claim 1, further including removing the heat from the cured 3D printed object after between about one second to about five minutes and allowing the cured 3D printed object to transition to an ambient temperature.

5. The method of claim 1, further including drying the cured 3D printed object in a vacuum oven.

6. The method of claim 1, wherein the heating of the cured 3D printed object is to a temperature between about 100 degrees Celsius and about 300 degrees Celsius in an ambient environment, and wherein the surface roughness of the cured 3D printed object is reduced by at least three times compared to the cured 3D object prior to the application of the heat.

7. The method of claim 1, wherein:
the alcohol is selected from benzyl alcohol, glycerol, and propylene glycol; and
heating the cured 3D printed object with the liquid solvent applied thereto includes:
heating to the temperature below the melting point of the cured 3D printed object using the localized heat source for a period of time, and
heating to another temperature above the melting point of the cured 3D printed object using the localized heat source for a portion of the period of time.

8. A method comprising:
forming a cured three-dimensional (3D) printed object;
applying a liquid solvent to the cured 3D printed object, the solvent including an alcohol;
heating the cured 3D printed object with the liquid solvent applied thereto to a temperature below a melting point of the cured 3D printed object using a localized heat source applying localized vectors of heat; and
after between about one second to about five minutes, removing the heat from the cured 3D printed object to reduce a surface roughness of the cured 3D printed object as compared to the cured 3D printed object prior to the application of heat.

9. The method of claim 8, wherein the surface roughness of the cured 3D printed object is reduced by at least ten times compared to the cured 3D object prior to the application of the heat, and the cured 3D printed object is formed from a polyamide material.

10. The method of claim 8, wherein the cured 3D printed object exhibits minimal change in Young's Modulus as compared to the cured 3D printed object prior to the application of the heat, and wherein for a portion of the about one second to about five minutes, applying the heat includes applying heat to another temperature that is above the melting point of the cured 3D printed object.

11. The method of claim 8, wherein applying the heat to the cured 3D printed object with the liquid solvent applied thereto and removing the heat causes an increase in tensile stress at maximum load and an increase in percent elongation at break as compared to the cured 3D printed object prior to the application of heat.

12. A system comprising:
a cured three-dimensional (3D) printed object formed by an additive printing process;
a solvent source to apply a solvent in a liquid form to the cured 3D printed object, the solvent including an alcohol;

a localized heat source to apply localized vectors of heat to the cured 3D printed object; and processor circuitry configured to cause the localized heat source to heat the cured 3D printed object with the solvent applied thereto to a temperature below a melting point of a build material forming the cured 3D printed object for between about one second to about five minutes to reduce a surface roughness of the cured 3D printed object as compared to the cured 3D printed object prior to the application of heat.

13. The system of claim 12, wherein the localized heat source includes a heat gun to provide the heat to the cured 3D printed object, and wherein the system further comprises an ambient environment within which the heating is performed.

14. The system of claim 12, wherein the cured 3D printed object has a first Young's Modulus prior to the application of heat and has about the first Young's Modulus after the application of heat, and the solvent includes a mixture including the alcohol and a second liquid, wherein the alcohol is selected from benzyl alcohol, glycerol, and propylene glycol.

15. The system of claim 12, further including a vacuum oven to vacuum dry the cured 3D printed object after the application of the heat.

*   *   *   *   *